United States Patent [19]

Brandolf

[11] 4,264,661
[45] Apr. 28, 1981

[54] THERMOPLASTIC ARTICLE AND PROCESS FOR MANUFACTURE OF SAME

[75] Inventor: Henry E. Brandolf, San Jose, Calif.

[73] Assignee: Raychem Corporation, Menlo Park, Calif.

[21] Appl. No.: 91,782

[22] Filed: Nov. 6, 1979

[51] Int. Cl.³ .................. B29D 23/02; B29C 25/00
[52] U.S. Cl. ................................. 428/36; 264/22;
    264/230; 264/317; 264/318; 264/328.1;
    425/174; 425/392; 425/542; 425/DIG. 58
[58] Field of Search ............ 264/22, 25, 26, 236,
    264/317, 318, 328.1, 230; 425/174, 174.4, DIG.
    58, 174.6, 392, 542; 428/35, 36; 204/159.2

[56] References Cited

U.S. PATENT DOCUMENTS

| | | |
|---|---|---|
| 2,793,970 | 5/1957 | Jeppson .................................. 264/22 |
| 3,548,190 | 12/1970 | Sclar et al. ............................ 425/174 |
| 3,563,973 | 2/1971 | Arditti et al. ........................... 264/22 |
| 3,923,949 | 12/1975 | Kane ..................................... 264/318 |
| 4,122,137 | 10/1978 | Böhm et al. ............................ 264/22 |
| 4,191,158 | 3/1980 | Curran .................................. 264/22 |

FOREIGN PATENT DOCUMENTS 1336869  11/1973  United Kingdom .

*Primary Examiner*—Jeffery R. Thurlow
*Attorney, Agent, or Firm*—James W. Peterson

[57] ABSTRACT

The invention is a process for manufacturing an irradiation cross-linked molded article by utilization of molding apparatus wherein at least a portion of the molding apparatus is separable and capable of withstanding irradiation.

4 Claims, 1 Drawing Figure

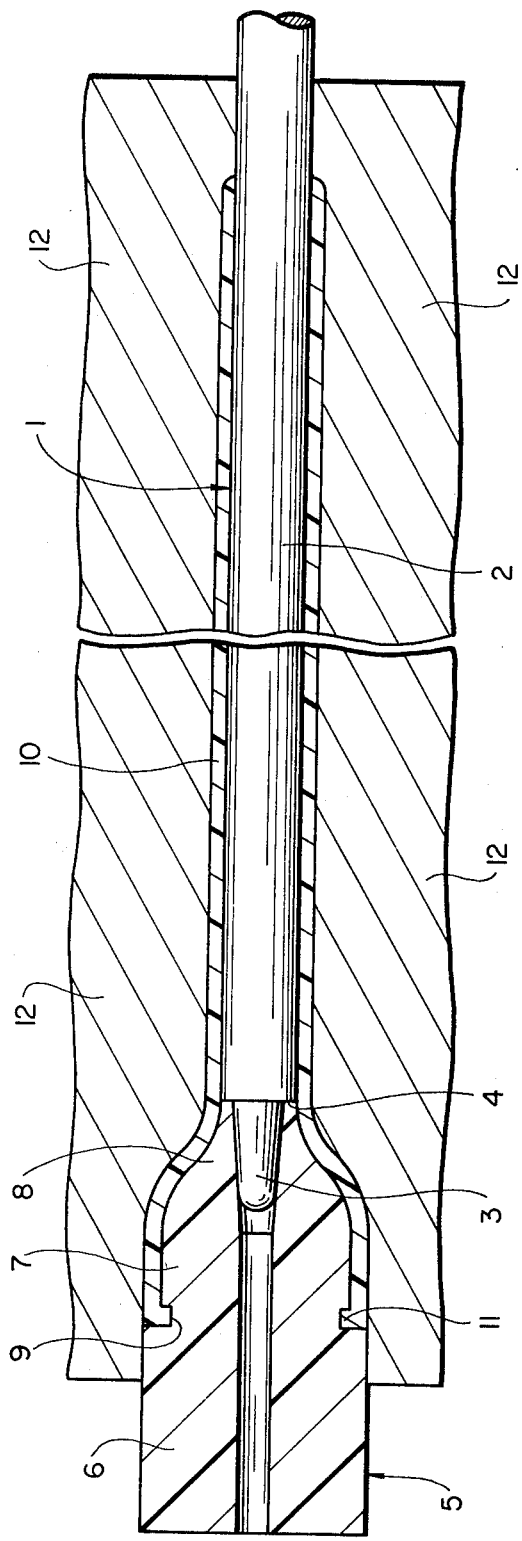
FIG_1

THERMOPLASTIC ARTICLE AND PROCESS FOR MANUFACTURE OF SAME

BACKGROUND OF THE INVENTION

A wide variety of processes for the manufacture of cross-linked thermoplastic articles are practised commercially. As an example of such processes, there may be mentioned the preparation of a thermoplastic polymeric material, e.g., polyethylene composition containing, inter alia, a chemical cross-linking agent such as a peroxide, which undergoes rapid decomposition with the concomitant generation of free radicals, by which cross-linking is initiated, at and above a certain temperature i.e. the decomposition temperature of the peroxide. The choice of the particular peroxide is based on a number of factors especially the processing temperature of the thermoplastic. The composition containing peroxide can be molded using conventional molding methods such as blow, transfer or injection molding if the article is to be a hollow article. The composition is then held at an elevated temperature in the mold for a time sufficient to effect cross-linking. Many crosslinked materials require irradiation for cross-linking and the instant invention is addressed to products requiring materials that must be irradiated. Specifically, this invention applies to products that require the use of polymer compositions of exceptional chemical stability and/or physical strength in which compositions cannot be cross-linked chemically. In addition, the instant invention applies to situations in which greater demands are made by the configurations, tolerances and cycle times of the molded article, and it is therefore necessary that the composition be molded, injection molded, transfer molded or the like.

U.K. Pat. No. 1,336,869, states "Because thermoplastic polymers lose their characteristic thermoplasticity when cross-linked, they cannot be molded by conventional procedures after being cross-linked and if articles of cross-linked polymer are required, the article must first be formed from the uncross-linked polymer and the cross-linking treatment then carried out on the article." If the shape of the injection molded article is complex, e.g., it includes a branch, or a lip or flange projecting into its interior, substantial difficulty is experienced in removing the uncross-linked article from an interior male former or core. Thus molding of complex articles presents particular difficulties in that blow and transfer molding and conventional injection molding all have fundamental shortcomings. The present invention is directed to solving the problems involved in precisely forming a cross-linked article of complex shape from a thermoplastic which is not amenable to chemical cross-linking.

SUMMARY OF THE INVENTION

The purpose of the present invention is to provide a process for manufacturing a shaped article of a cross-linked thermoplastic composition, wherein said article is of a comparatively complex internal configuration. To accomplish this purpose the instant invention provides a process comprising the steps of: (a) molding a thermoplastic composition to form an article which does not cross-link under the molding conditions, wherein a portion of the molding apparatus utilized is separable and capable of withstanding irradiation, (b) removing the article from the mold apparatus with the separable portion of the molding apparatus being retained by the molded article, (c) irradiating the article to cross-link it and then, (d) removing the separable portion from supporting contact with the article after cross-linking and if desired, then rendering the article heat-recoverable.

DESCRIPTION OF THE PREFERRED EMBODIMENT

With reference to the drawing it can be seen that the instant invention is a process and product made thereby utilizing unique molding apparatus. The embodiment described hereinafter has a multi-piece core which is necessary because the product being manufactured has a complex configuration in the form of an undercut on the inside of the product. It is within the scope of the invention to have a multipiece mold versus core for similar detail on the outside of the product. It is further possible to have multipiece cores and molds when desired.

When the radiation is ionizing radiation, which is preferred, the separable portion of for example the core means is advantageously made from a dielectric, such as a thermoset resin, (epoxy or phenolic resin) in order to avoid the need to increase the radiation dose, which may be necessary if a metallic core portion were employed. Making the core segment from a material such as phenolic is only necessary in the area of the molded article where the configuration of the article i.e. the section of the article having a complex configuration, precludes removing the core causing subsequent damage to the molded part. The remainder of the cored section can be made from metal because it can be removed without causing damage.

It has been found that, after cross-linking, the separable portion may be readily removed from within a hollow article of a complex shape whereas, before the composition was cross-linked, the article could not be released without damage. Advantageously, the mold core can be coated with a suitable release agent to facilitate removal of the cross-linked hollow molded article.

Since the separable portions of either a mold or a core may be made of a relatively cheap material, the invention also allows the possibility of making articles of greater complexity in shape than any alternative methods, since the separable portion may, if desired, be destroyed to remove it. Such destruction may be by any mechanical or chemical method that does not harm the article. For example, if the article is relatively elastic or flexible, the assembly may be subjected to impact and/or more prolonged pressure, to crack or split the separable portion into pieces small enough to be removed.

The process of the invention has proved especially useful for the manufacture of articles from the following polymers which are not generally suitable for chemically cross-linking during the molding operation and are therefore particularly appropriate for use according to the present invention:

Hytrel (Block copolymer comprising blocks of poly tetramethylene ether and poly ethyleneterephthalate)
Halar (Alternating copolymer comprising units derived from ethylene and chloro trifluoroethylene)
Tefzel (Alternating copolymer comprising units derived from ethylene and tetrafluoroethylene)
Polybutylene Terephthalate
FEP Fluorinated Ethylene-Propylene As will be appreciated, the term "thermoplastic" includes all materials that before cross-linking are melt-processable, regardless of their final properties after cross-linking.

It is within the scope of the invention to render a hollow article heat-recoverable. This is accomplished by removing the article from the mold, heating it to (or maintaining it at) a temperature above its material recovery temperature (its crystalline melting point in the case of, e.g., polyethylene) and then deforming the article and then maintaining the deforming force while the deformed article is cooled below its recovery temperature.

With reference to the accompanying drawing, the single FIGURE illustrates in cross section a part of a core means indicated generally by the reference numeral 1. The core means 1 has a metal shaft portion 2 of constant circular cross-section having a coaxial tapered section 3. The larger end of tapered section 3 is of smaller diameter than the diameter of the circular cross-section of shaft portion 1 so that an annular shoulder 4 remains around the base of the tapered section 3. Mounted over the tapered section 3 is a phenolic separable portion indicated generally by the reference numeral 5. The separable portion 5 comprises, at its free end, a cylindrical part section 6 of larger diameter than shaft portion 2, a small diameter section 7 and an end section 8 by which the separable portion is mounted. End section 8 narrows down to the same outer diameter as that of the shaft portion 2, the shoulder 4 of which it abuts. An annular groove 9 is provided between the sections 6 and 7 to form the interior part configuration. The inner surface of the end section 8 is a tight fit over the tapered section 3.

In operation, the assembly of separable portion 5 and shaft portion 1 are mounted in a splitable mold indicated by the numeral 12. Flowable thermoplastic material is then injected around it to form an article or "boot" having a long narrow section 10, broadening out in a shape corresponding to the outer surface of end section 8 and small diameter section 7 of the separable portion 5, and having a lip 11 corresponding to the annular groove 9. The lip 11 is the section of the article having a complex configuration. After the material has cooled sufficiently, the mold 12 is opened, and the core means 1 and boot are removed from the mold. The metal shaft portion 1 is extracted from within the boot, leaving the phenolic separable portion 5 inside the wide end. The boot is then irradiated, and the separable portion 5 easily extracted, as for example by heating and expanding the boot. While one particular injection molded article and the core means and mold for making it have been described, the process described is applicable to any complex shaped article requiring injection molding and irradiation cross-linking.

It is within the scope of the invention to make the entire core out of a phenolic type material if complex configurations of the article to be made require. It is also within the scope of this invention to reverse the use of such phenolic material, i.e. by making the mold of phenolic and the core out of metal, or any combination thereof if complex article configurations require.

Other variations and modifications in accordance with the percent invention will be apparent to those skilled in the art. The invention, therefore is not restricted except by the spirit of the appended claims.

What is claimed is:

1. A process for making an article of cross-linked thermoplastic composition comprising the steps of:
    (a) Molding a thermoplastic composition to form a shaped article having a section thereof of complex configuration in molding apparatus having a separable portion thereof of dielectric material capable of withstanding irradiation, said separable portion being in contact with the section of complex configuration of the article;
    (b) removing the shaped article from the molding apparatus along with the separable portion remaining in contact with the section of complex configuration;
    (c) irradiating the article to cross-link it; and
    (d) removing the separable portion from contact with the article.

2. A process as in claim 1 further including the steps of:
    (a) Heating the article to a temperature above its material recovery temperature;
    (b) deforming the article while maintaining said elevated temperature; and
    (c) cooling the article while maintaining deforming force thereby making the article heat recoverable.

3. A process as in claim 1 wherein the molding apparatus comprises an injection mold and complimentary core means and said separable portion is a portion of said core means.

4. A product made by the process of claim 1.

* * * * *

UNITED STATES PATENT AND TRADEMARK OFFICE
CERTIFICATE OF CORRECTION

PATENT NO. : 4,264,661
DATED : April 28, 1981
INVENTOR(S) : Henry E. Brandolf

It is certified that error appears in the above-identified patent and that said Letters Patent are hereby corrected as shown below:

In the specification, column 4, line 15, "percent"

should read -- present --.

Signed and Sealed this

Seventeenth Day of August 1982

[SEAL]

Attest:

Attesting Officer

GERALD J. MOSSINGHOFF

Commissioner of Patents and Trademarks